C. C. BURNHAM.
METHOD OF MAKING SHOES.
APPLICATION FILED JUNE 5, 1915.
1,206,750.
Patented Nov. 28, 1916.
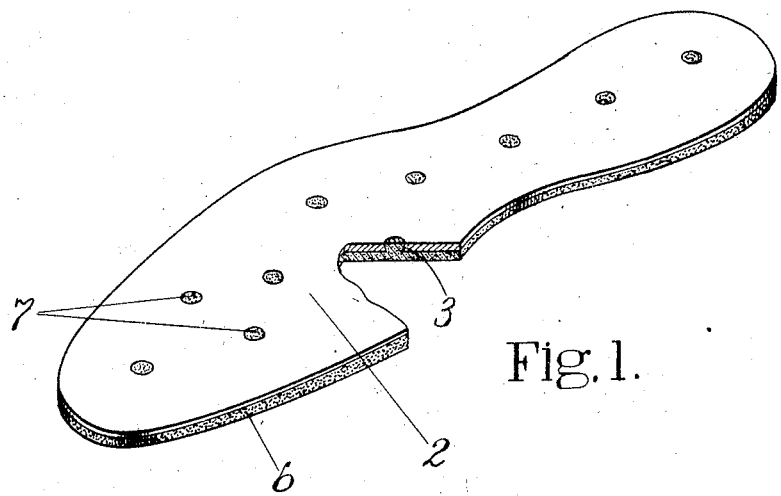
Fig. 1.
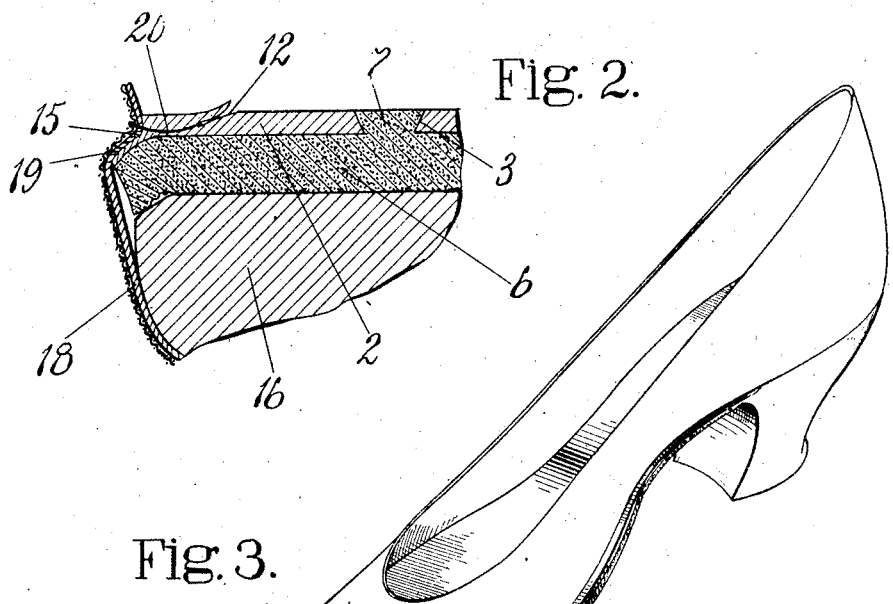
Fig. 2.
Fig. 3.
INVENTOR.
Chester C. Burnham
By his Attorney,
Nelson W. Howard

UNITED STATES PATENT OFFICE.

CHESTER COLBY BURNHAM, OF NORTH BROOKFIELD, MASSACHUSETTS, ASSIGNOR TO THE B & R RUBBER CO., OF NORTH BROOKFIELD, MASSACHUSETTS, A CORPORATION OF MASSACHUSETTS.

METHOD OF MAKING SHOES.

1,206,750.  Specification of Letters Patent.  Patented Nov. 28, 1916.

Application filed June 5, 1915. Serial No. 32,450.

*To all whom it may concern:*

Be it known that I, CHESTER COLBY BURNHAM, a citizen of the United States, residing at North Brookfield, in the county of Worcester and State of Massachusetts, have invented certain Improvements in Methods of Making Shoes, of which the following description, in connection with the accompanying drawings, is a specification, like reference characters on the drawings indicating like parts in the several figures.

This invention relates to processes of making shoes and particularly to the production of soles for use in the manufacture of the type of shoes commercially known as "turn shoes".

Owing to the many advantages of rubber soles and to the scarcity and consequent increased cost of sole leather, there has recently been a great increase in the manufacture of rubber soled shoes, and considerable progress has been made in the development and manufacture of rubber soles suitable for double soled shoes such as welt and McKay sewed shoes, in which the rubber sole is secured to the shoe by stitching it to the welt or to a middle sole. But owing to the peculiar conditions attendant upon the manufacture of turn shoes the rubber soles such as have been used in the manufacture of welt and McKay sewed shoes have been entirely unsuitable for turn shoes and prior to this invention a rubber sole has never been produced which was practicable for turn shoes.

The present invention has for its principal object a process of making a rubber sole for turn shoes whereby a practical and satisfactory rubber soled turn shoe may be produced.

With this object in view, the process of the present invention, in a broad aspect, comprises providing a layer of leather of sufficient thickness to carry a channel and to be shouldered, applying a layer of rubber or any of its well known compounds to one side of the leather, and uniting the leather and rubber by vulcanization. The sole so produced may thereafter be channeled and shouldered and utilized in the usual manner in the manufacture of single sole turn shoes by the turn shoe process.

The invention will appear more fully from the following description when considered in connection with the accompanying drawings and will then be pointed out in the claims.

In the drawings:—Figure 1 is a perspective view of a sole made in accordance with the process of the present invention; Fig. 2 is an enlarged cross section of a portion of a shoe illustrating the method of securing the shoe upper to the rubber sole; Fig. 3 is a perspective view, with a portion broken away, of a shoe made in accordance with the process of the present invention.

In carrying out the process of this invention in one manner in which I have successfully practised it, I first provide a leather sole blank 2 of sufficient thickness to enable it to carry a sewing channel and to be shouldered by a suitable machine in the manner ordinarily practised in turn shoe making. The kind or brand of leather used for this blank is an important consideration in practising the invention, since it has been found by experiment that certain kinds of leather, for example, vegetable and chemical tanned leathers of strong fibrous texture, are better adapted to withstand uninjured the degree of heat required for vulcanization, while oil tanned and plumped leathers are destroyed and become useless when subjected to a high degree of heat. The soft fleshy material, if any, on the face of the leather blank to which the rubber is later to be applied may now be removed by a suitable machine, in order that the rubber may become securely bonded to the firmer body portion of the leather blank during vulcanization. The blank 2 is then provided with a plurality of countersunk apertures 3 extending through the leather from its upper side, which are located well in from the edge of the blank so as not to interfere with the channeling or shouldering operations. The leather blank 2 is now subjected to such treatment that it can be vulcanized to rubber without injury to the leather. It has been found that unless substantially all the moisture is previously extracted from the leather the high degree of heat required for vulcanizing destroys the strength and flexibility of the leather, frequently rendering it brittle or spongy.

Accordingly the next step in the process consists in extracting moisture, preferably substantially all of the moisture, from the leather blank. This may be accomplished in any well known manner, for example, by the use of heat. A comparatively thick layer of calendered or plastic rubber 6 or any of its well known compounds is then applied to the lower or flesh side of the leather blank 2 and the blank with the rubber applied is placed under pressure in any suitable vulcanizing apparatus. The pressure exerted upon the sole during this step in the process embeds the fibers of the leather more or less in the rubber compound and forces the plastic rubber into the apertures in the leather blank thus firmly locking the rubber and leather layers together by a number of inverted frusto-conical keys or rubber rivets 7 integral with the rubber body. The rubber rivets not only add to the security of the attachment of the rubber to the leather facing but also serve the important function of preventing relative bodily movement of the leather and rubber as the sole is flexed in walking. The sole remains in the vulcanizing apparatus during such time and at such a degree or degrees of heat as is necessary to "cure" the rubber and cause it to become firmly bonded to the leather. In making a turn shoe with the sole thus produced, the relatively thin leather faced side of the sole is provided with the usual sewing channel 12 and shoulder 15, the depth of the channel 12 being substantially less than the thickness of the leather facing 2 of the sole and the shoulder 15, preferably of such depth as to allow a portion 19 of the leather facing to extend to the outer edge of the rubber sole thus obviating any tendency of the rubber of the shoe to pull or tear the leather facing from the rubber during wear of the shoe. The sole is now assembled upon a last 16 with the rubber side of the sole against the bottom of the last, it being noted that the sole readily conforms to the contour of the bottom of the last especially at the edges, as shown in Fig. 2, thereby facilitating the lasting operation and insuring the sole edge from being "picked up" by the needle in the upper attaching operation. In the manufacture of turn shoes having all-leather soles it is necessary to "mold" the soles to obtain this desired fit at the edges of the last. The shoe upper is lasted over the feather edge 19 and against the shoulder in the usual manner and the upper 18 is secured, with the wrong side out, by the stitches 20 to the channeled and shouldered leather layer 2. It is to be here noted that the leather layer or backing 2 is of such a thickness that the sewing instrumentalities pass only through the leather thus greatly facilitating the sewing of the upper to the sole since the awl and needle do not tend to heat and break as when passing through rubber compound. The shoe is now turned to present the rubber portion of the sole outward and its manufacture is completed in the usual manner.

By the method herein disclosed there may be economically produced a rubber sole which is especially adapted to meet the peculiar requirements attending the manufacture of turn shoes and which may be utilized in the making of a shoe according to the usual methods followed in the making of a leather soled turn shoe; and for the first time in the history of the industry a rubber soled turn shoe may be made which will possess the advantages of the rubber sole in the way of economy, comfort and flexibility, and which will at the same time be serviceable and of neat appearance.

The novel sole and shoe herein disclosed are not herein claimed but are made the subject-matter of my co-pending application Serial No. 46,851, filed Aug. 23, 1915.

Having thus described my invention, what I claim as new and desire to secure by Letters Patent of the United States is:—

1. The process of making, as an article of manufacture, a rubber sole for a turn shoe which comprises providing a leather blank which is adapted to be channeled and shouldered, applying a layer of rubber compound to one side of the blank, subjecting the leather blank and rubber compound to a sufficient degree of heat to cause the rubber compound to become firmly bonded to the fibers of the leather blank, and then forming a shoulder and a channel on the leather portion of the sole.

2. That improvement in the art of making turn shoes which comprises providing a leather blank, treating the leather so as to extract moisture, applying a layer of rubber compound to one side of the leather blank, uniting the leather and rubber by vulcanization, channeling and shouldering the leather blank and securing a shoe upper to the sole by sewing the upper to the leather portion of the sole in the usual manner.

3. That improvement in methods of making turn shoes which comprises vulcanizing to a rubber sole body leather thick enough to be channeled and shouldered, channeling and shouldering the leather portion of the sole, assembling a shoe with the rubber side of the sole inside, lasting the upper and sewing it to the channeled and shouldered leather portion of the sole and turning the shoe to present the rubber side of the sole outward.

4. That improvement in the art of making turn shoes which comprises providing a leather shoe upper securing member, vulcanizing a layer of rubber compound to the leather member, channeling and shouldering said leather member and securing a shoe upper to the sole by the channel and shoulder provided on said leather portion.

In testimony whereof I have signed my name to this specification.

CHESTER COLBY BURNHAM.